United States Patent [19]
Kim et al.

[11] Patent Number: 5,862,677
[45] Date of Patent: Jan. 26, 1999

[54] CASING UNIT OF AIR CONDITIONING SYSTEM AND AIR CONDITIONING SYSTEM FOR AUTOMOBILES USING THE SAME

[75] Inventors: Jae-hyung Kim, Pyungtaek; Seong-seok Han, Taejon, both of Rep. of Korea

[73] Assignee: Halla Climate Control Corporation, Taejon, Rep. of Korea

[21] Appl. No.: 900,114

[22] Filed: Jul. 25, 1997

[30] Foreign Application Priority Data

Jul. 27, 1996 [KR] Rep. of Korea ............... 96-30864

[51] Int. Cl.⁶ .................. B60H 1/32; B60H 1/22
[52] U.S. Cl. .................. 62/244; 454/161; 165/42
[58] Field of Search .................. 62/239, 244, 404, 62/407, 408, 409, 410, 411; 454/156, 160, 161; 165/42

[56] References Cited

U.S. PATENT DOCUMENTS

| | | | |
|---|---|---|---|
| 4,513,808 | 4/1985 | Ito et al. | 165/43 |
| 4,586,652 | 5/1986 | Sakurai | 236/13 |
| 4,702,307 | 10/1987 | Ito et al. | 165/42 |
| 4,842,047 | 6/1989 | Sakurada et al. | 165/43 |
| 4,940,083 | 7/1990 | Takenaka et al. | 165/42 |
| 5,199,485 | 4/1993 | Ito et al. | 165/22 |
| 5,309,731 | 5/1994 | Nonoyama et al. | 62/244 |

Primary Examiner—William Doerrler
Attorney, Agent, or Firm—Leydig, Voit & Mayer

[57] ABSTRACT

A casing unit of an air conditioning system includes a main path through which air is supplied by a blower unit and in which a first heat exchanger is installed, a bi-path formed by a partition wall to connect the inlet and outlet thereof to the main path and in which a second heat exchanger is installed, a plurality of distribution paths connected to the main path to supply air passed through the main path and/or the bi-path, a bypass to supply the air passed through the first heat exchanger to one of the plurality of distribution paths, and a connection path connected to the bi-path and one of the distribution paths. The plurality of doors are installed in the case to control the flow of air to the respective paths.

10 Claims, 15 Drawing Sheets

CASING UNIT OF AIR CONDITIONING SYSTEM AND AIR CONDITIONING SYSTEM FOR AUTOMOBILES USING THE SAME

BACKGROUND OF THE INVENTION

The present invention relates to an air conditioning system, and more particularly, to a casing unit of an air conditioning system having a heat exchanger installed inside thereof and paths for controlling the flow of the air, and an air conditioning system employing the casing unit.

In a typical air conditioning system for an automobile, air is blown by a blower unit toward an evaporator through which coolant flows or a heater core through which cooling water of an engine of an automobile flows so that heat exchange with the air occurs to enable cooling or heating of the inside of an automobile. The heat-exchanged air is supplied into the inside of the automobile through ducts, thereby cooling or heating the inside of the automobile.

FIG. 1 shows an example of a case of a conventional air conditioning system.

Referring to the drawing, air supplied from a blower unit 1 selectively passes through an evaporator 100 and a heater core 200 which are installed in a main path 11. Then, the air is supplied to the inside of an automobile through the respective paths 15, 16 and 17 depending on actions of doors 12, 13 and 14 so that cooling or heating is achieved.

However, the above casing unit of an air conditioning system cannot provide separate cooling/heating of the driver's seat and a passenger's seat or the rear seat.

To solve the problem, the heat exchange unit and the blower unit for the front seat and the rear seat must be independently installed. However, such a solution requires much space for installation of both units and is accompanied by complicated support devices such as a compressor, a cooling device for a condensing unit, and a controller.

SUMMARY OF THE INVENTION

To overcome the above problems, it is an objective of the present invention to provide a casing unit of an air conditioning system which can separately air-condition the front and rear parts inside an automobile to effectively control the temperature thereinside, and an air conditioning system using the above casing unit.

Accordingly, to achieve the above objective, there is provided a casing unit of an air conditioning system comprising a case and a plurality of doors. The case includes: a main path through which air is supplied by a blower unit and in which a first heat exchanger is installed; a bi-path formed by a partition wall to connect the inlet and outlet thereof to the main path and in which a second heat exchanger is installed; a plurality of distribution paths connected to the main path to supply the air passed through the main path and/or the bi-path; a bypass to supply air passed through the first heat exchanger to one of the plurality of distribution paths; and a connection path connected to said bi-path and the one of said distribution paths. The plurality of doors installed in the case controls the flow of air to the respective paths.

According to another embodiment of the present invention, there is provided a casing unit of an air conditioning system comprising left and right cases and a plurality of doors. Each of the left and right cases is separated by a partition panel and includes: a main path through which air is supplied by a blower unit and in which a first heat exchanger is installed; a bi-path formed by a partition wall to connect the inlet and outlet thereof to the main path and in which a second heat exchanger is installed; a plurality of distribution paths connected to the main path to supply the air passed through the main path and/or the bi-path; a bypass to supply air passed through the first heat exchanger to one of the plurality of distribution paths; and a connection path connected to the bi-path and the one of the distribution paths. The plurality of doors installed in each of the cases controls the flow of air to the respective paths.

It is preferable in the present invention that each of the distribution paths comprises: a front path to supply air to a vent of a front panel in which a dashboard is installed; a defrost path to supply air to a defrost vent; a floor path to supply air to a floor vent and a rear floor vent; and a console path connected to the bypass and the connection path to supply air to a rear console.

Also, it is preferable in the present invention that the plurality of doors comprises: a first door for opening/closing the inlet of the bi-path and the main path between the first and said second heat exchangers; a second door for opening/closing the outlet of the bi-path; third doors for opening/closing the distribution paths; and fourth and fifth doors for respectively opening/closing the inlet and the outlet of the bypass.

According to another aspect of the present invention, there is provided an air conditioning system comprising a blower unit, a case and a plurality of doors. The case includes: a main path through which air is supplied by the blower unit and in which a first heat exchanger is installed; a bi-path formed by a partition wall to connect the inlet and outlet thereof to the main path and in which a second heat exchanger is installed; a plurality of distribution paths connected to the main path to supply the air passed through the main path and/or the bi-path; a bypass to supply air passed through the first heat exchanger to one of the plurality of distribution paths; and a connection path connected to the bi-path and the one of the distribution paths. The plurality of doors installed in the case controls the flow of air to the respective paths.

BRIEF DESCRIPTION OF THE DRAWINGS

The above objective and advantage of the present invention will become more apparent from the following detailed description of a preferred embodiment and the attached drawings in which.

DETAILED DESCRIPTION OF THE INVENTION

Figure 1:
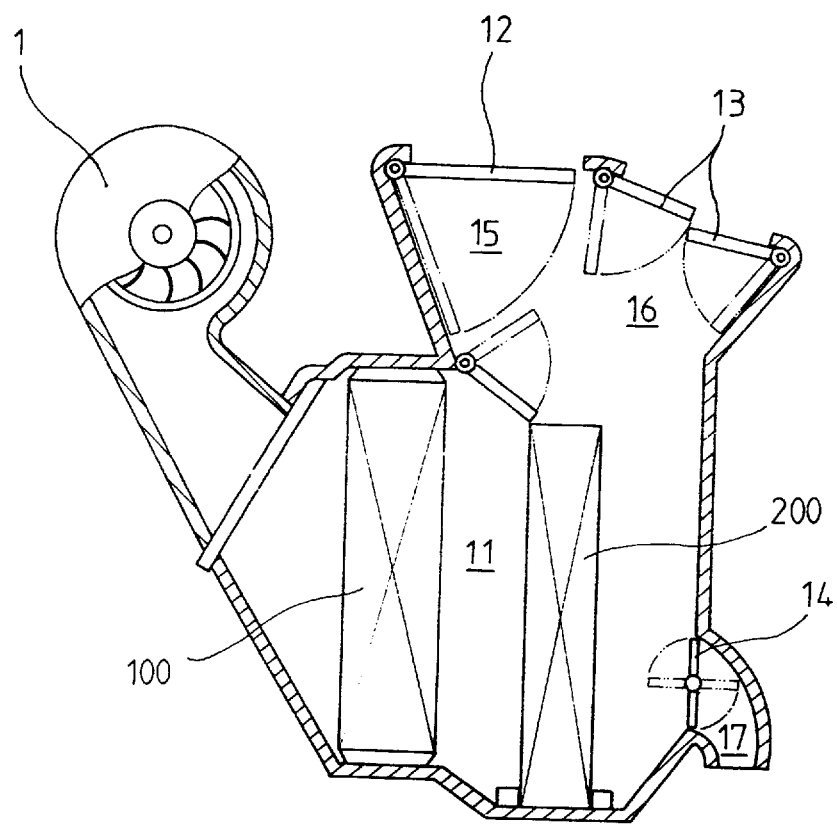
FIG. 1 is a sectional view illustrating a casing unit of a conventional air conditioning system.
Figure 2:
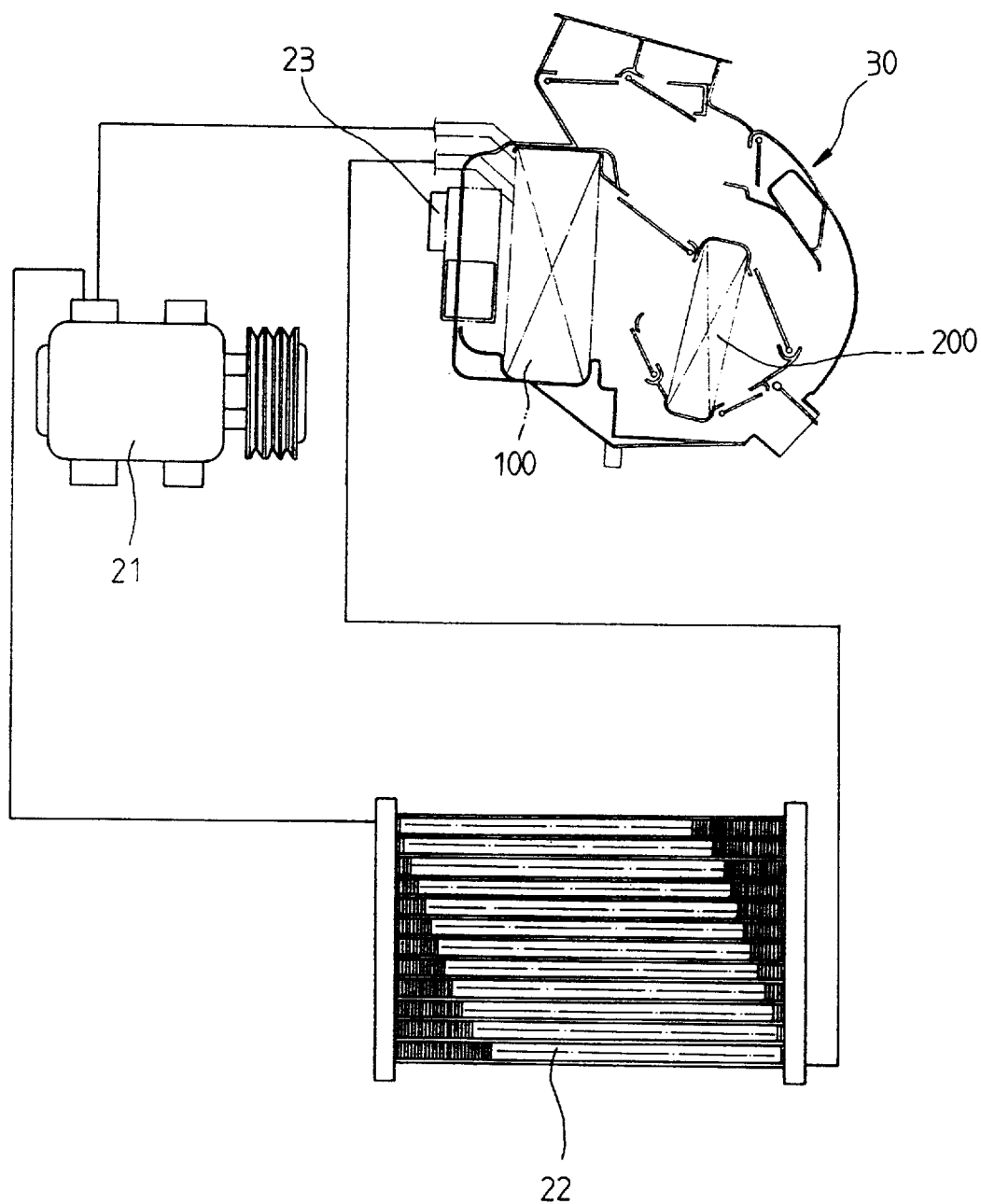
FIG. 2 is a diagram showing the structure of an air conditioning system according to the present invention.

According to an air conditioning system of the present invention, independent cooling/heating to the front seat and the rear seat inside an automobile can be achieved. Referring to FIG. 2, the air conditioning system of the present invention is comprised of a compressor 21 which is installed in an engine compartment (not shown) of the automobile and driven by an engine, a condenser 22 for condensing heat exchange material compressed by the compressor 21, a blower unit 23 installed under the instrument panel, and a casing unit 30 which selectively supplies air blown from the blower unit 23 toward each part of the inside of the automobile. In the casing unit 30, a first heat exchanger 100 connected to the compressor 21 and a second heat exchanger 200 using cooling water of the engine as a heat exchange medium are installed.

Figure 3:
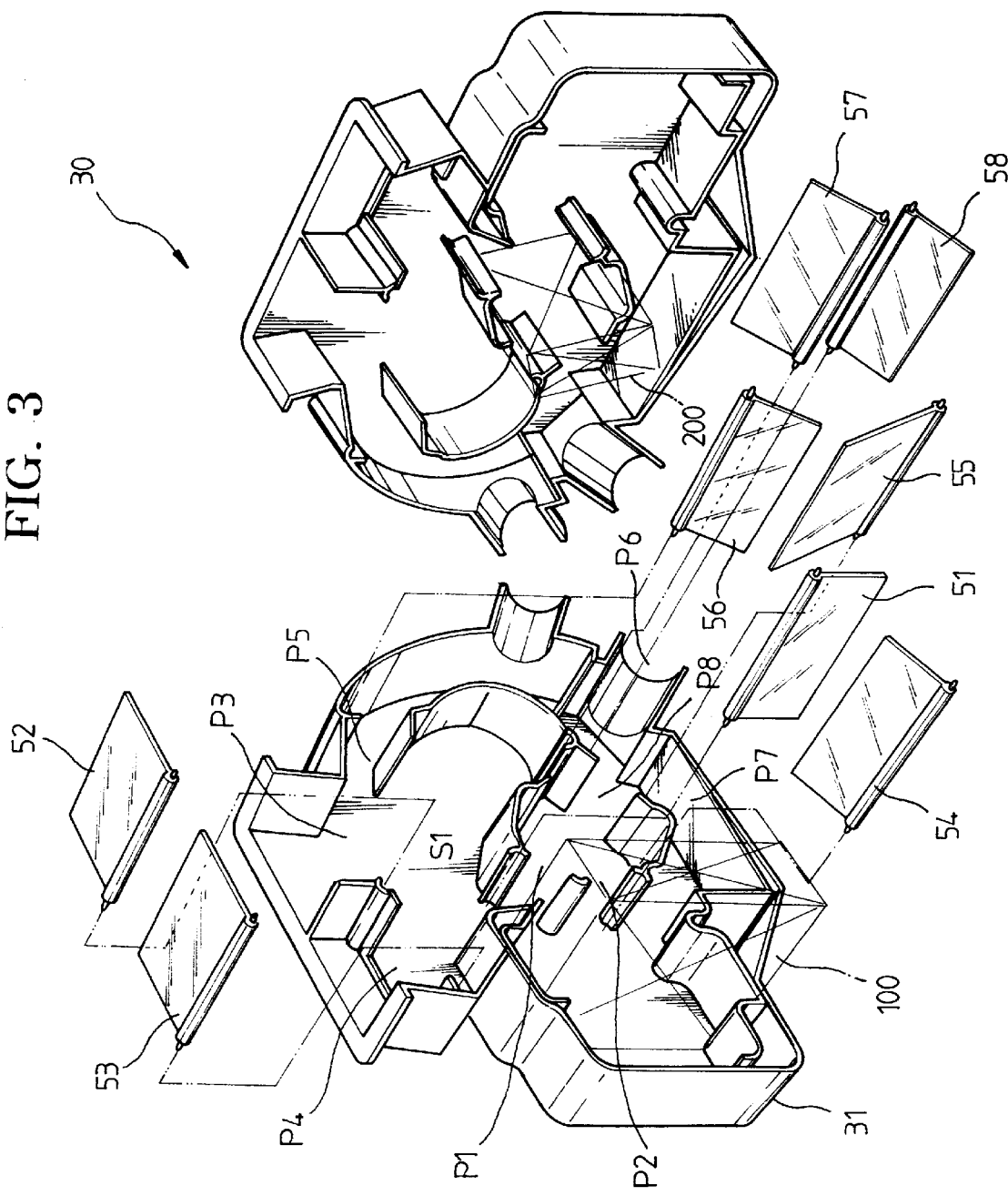
FIG. 3 is an exploded perspective view illustrating a casing unit of an air conditioning system according to an embodiment of the present invention.
Figure 4:
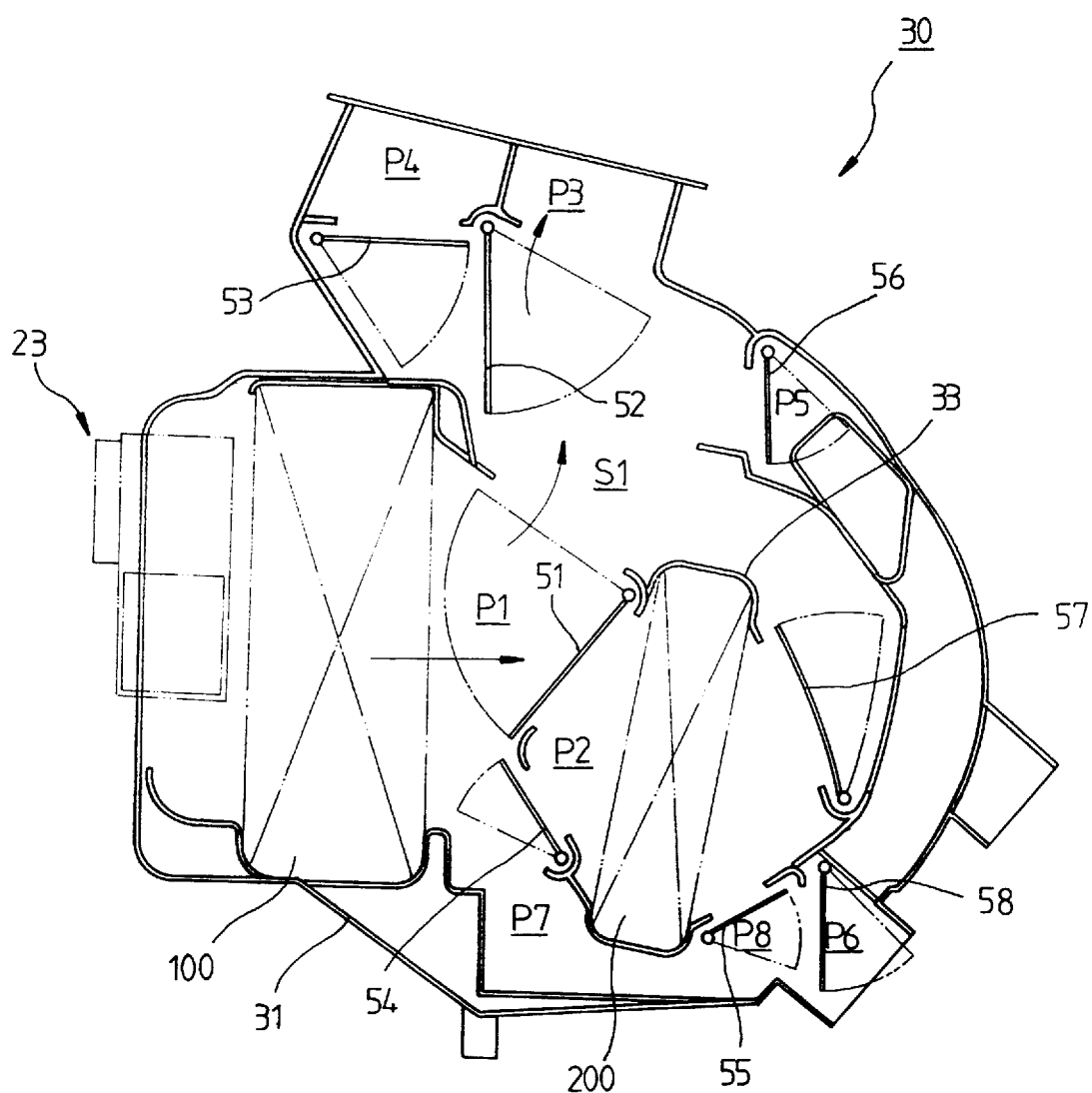
FIG. 4 is a sectional view of the casing unit shown in FIG. 3.

A preferred embodiment of the casing unit 30 is illustrated in FIGS. 3 and 4. Referring to the drawings, the casing unit 30 includes a case 31 connected to an exhaust opening of the blower unit 23 in which a main path P1 is formed. The first heat exchanger 100 such as an evaporator is installed at an inlet of the main path P1. A bi-path P2 is formed in the case 31 to connect with the main path P1 by a partition wall 33. The second heat exchanger 200 using the cooling water of the engine as a heat exchange medium is installed in the bi-path P2.

A mixing space S1 is formed at a place where the outlet of the bi-path P2 and the main path P1 meet, in which the air passing through the bi-path P2 is mixed with the air flowing through the main path P1. A plurality of distribution paths, i.e., a front path P3 and a defrost path P4, are formed above the mixing space S1 in the upper portion of the case 31. The front path P3 is connected to a vent (not shown) leading to a front panel in which a dashboard of the automobile is installed, and the defrost path P4 is connected to a duct leading to a defrost vent (not shown).

A floor path P5 connected to ducts leading to a floor vent (not shown) and a rear floor vent and a console path P6 connected to a duct leading to a rear console (not shown) are formed in the case 31 opposite the main path P1.

A bypass P7 is formed at the lower portion of the case 31, of which the inlet is located between the first and second heat exchangers 100 and 200. The bypass P7 is connected to a connection path P8 which is connected to the outlet of the second heat exchanger 200 and the connection path P8 is connected to the console path P6.

A door for controlling the flow of air supplied from the blower unit 23 is installed at the inlet of the respective paths formed in the case 31. That is, a first door 51 for controlling the air to selectively flow through the main path P1 and the bi-path P2 and second and third doors 52 and 53 are installed at the inlets of the front and defrost paths P3 and P4, respectively. Also, fourth and fifth doors 54 and 55 are installed at the inlet and the outlet of the bypass P7, respectively, and a sixth door 56 is installed at the inlet of the floor path P5. A seventh door 57 for controlling the flow of air to the mixing space S1 is installed, and an eighth door 58 is installed at the console path P6.

Figure 5:
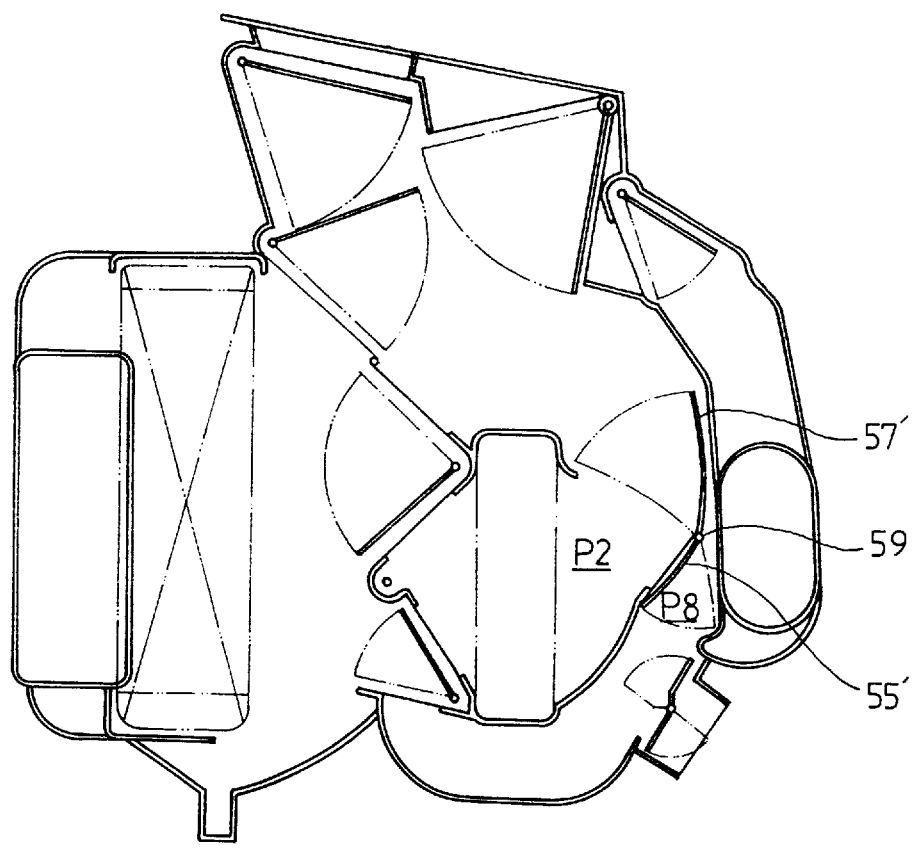
FIG. 5 is a sectional view illustrating an example in which the door of the casing unit shown in FIG. 3 is modified.

Alternatively, as shown in FIG. 5, the connection path P8 extends to the outlet of the bi-path P2 and a seventh door 57' for opening/closing the inlet of the bi-path P2 and a fifth door 55' for opening/closing a portion of the connection path P8 can be installed together on a single rotation shaft 59 located at the inlet of the connection path P8.

The first through eighth doors 51–58 each are driven by a predetermined driving unit (not shown) and the driving unit includes an actuator (not shown) coupled to a link (not shown) which is connected to a rotation shaft of each door. Also, the driving unit can have various structures to pivot the rotation shaft of the door. For instance, the door can be opened/closed by the driving of a cam having a guide groove which is coupled with the link installed on the rotation shaft of a cable (not shown) installed on each door.

The operation of an air conditioning system employing a casing unit according to an embodiment of the present invention will now be described with reference to FIGS. 4 and 7 through 15.

In a cooling mode, a coolant is supplied to the first heat exchanger 100 (see FIG. 2) by the driving of the compressor 21 and cooling water of the engine is supplied to the second heat exchanger 200. At this time, the air supplied to the main path P1 of the case 31 by the blower unit 23 passes through the first and second heat exchangers 100 and 200 by the operation of the respective doors 51–58, performing heat exchange, and is supplied to each portion of the inside of the automobile.

The above action will now be described in detail according to each air-flow mode.

When the inside of an automobile is cooled, that is, during a vent mode in which the air supplied by the blower unit 23 and passed through the first heat exchanger 100 is supplied to a vent (not shown) formed in the front panel of the automobile, the inlet of the bi-path P2 in which the second heat exchanger 200 is installed is closed by pivoting the first door 51, as shown in FIG. 4. The front path P3 which is connected to the vent becomes open by pivoting the second door 52. The inlet of the bypass P7 is opened and concurrently the bi-path P2 is closed by pivoting the fourth door 54. Also, the outlet of the bi-path P2 is closed by pivoting the seventh door 57, and the fifth door 55 opens the outlet of the bypass P7 while simultaneously closing the connection path P8.

Thus, the air supplied from the blower unit 23 after undergoing a heat exchange in the first heat exchanger 100 is supplied to the vent of the front panel through the main path P1 and the front path P3.

Figure 7:
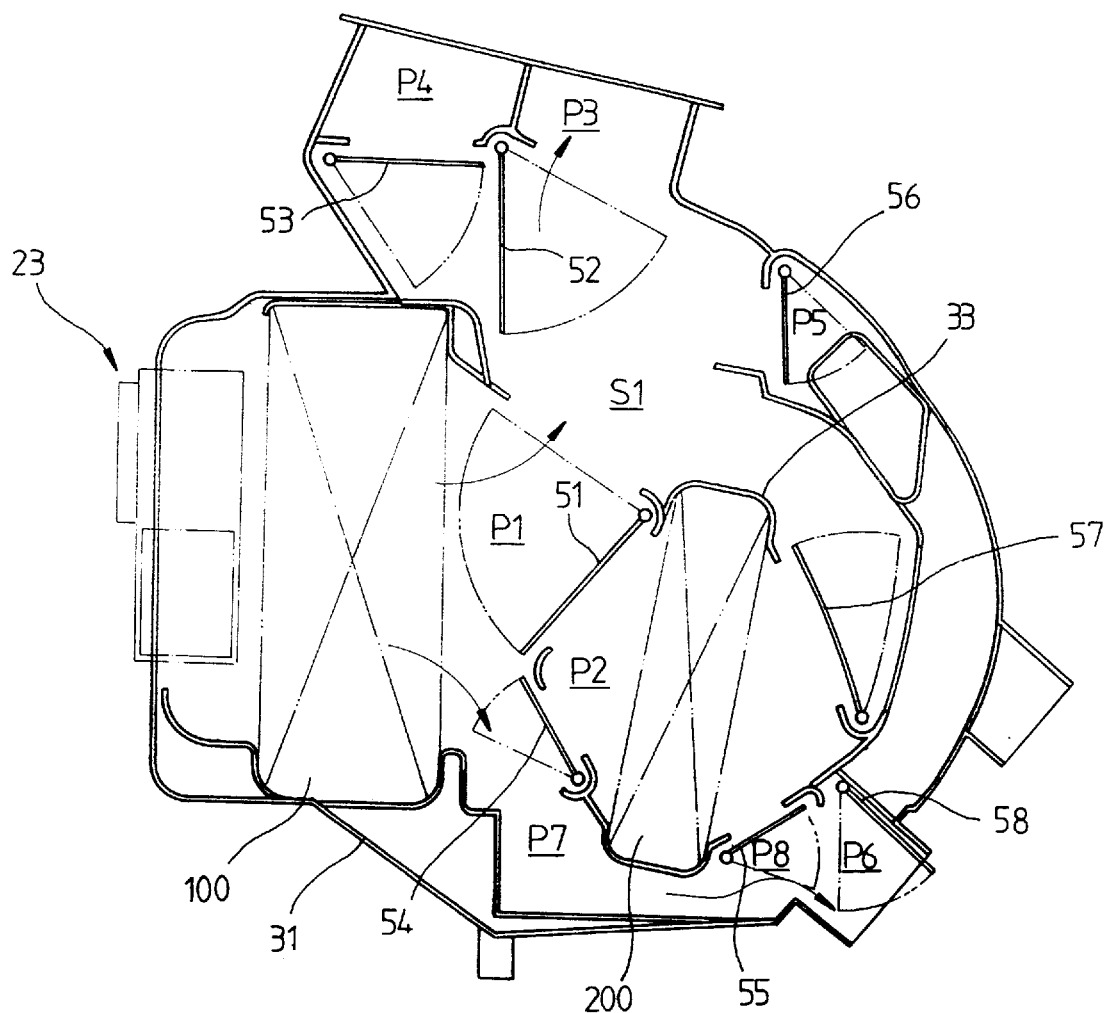
FIGS. 7 through 15 are sectional views of the casing unit shown in FIG. 3 for illustrating the operation of the doors according to the air flow mode.

In order to supply cool air toward the rear console in the vent mode, as shown in FIG. 7, the console path P6 connected to the bypass P7 is open by manipulating the eighth door 58. Thus, the air supplied to the main path P1 is cooled by passing through the first heat exchanger 100 and then supplied toward the rear console through the bypass P7 and the console path P6.

Figure 8:
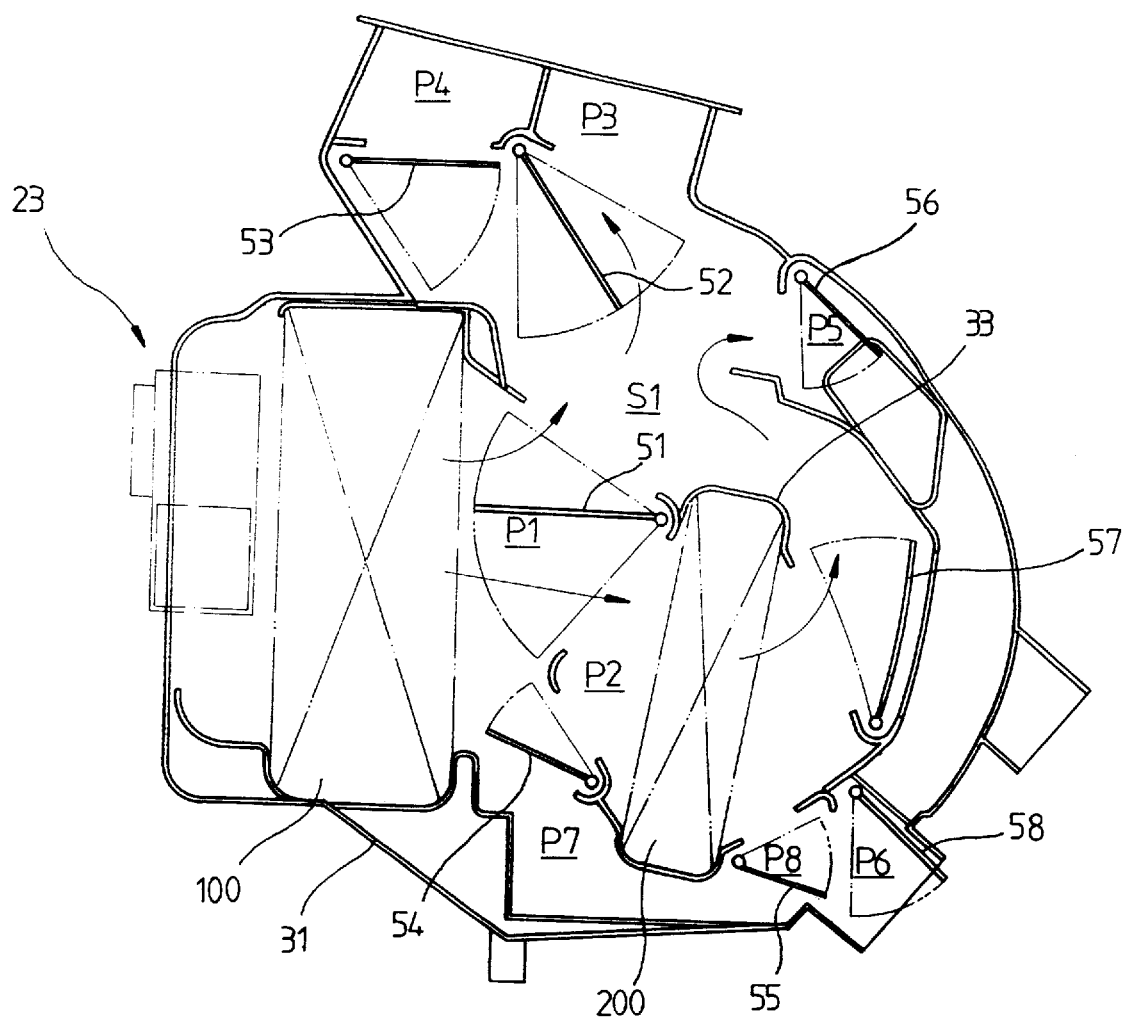

In FIG. 8, the actions of the doors are illustrated for a bi-level mode in which cool air and heated air are supplied. First, to supply the two air flows which differ greatly in temperature to the front panel vent and the floor vent, respectively, a portion of the bi-path P2 is opened by partially opening the first door 51 and completely opening the seventh door 57. Also, the second door 52 is opened to open a portion of the front path P3 and simultaneously the sixth door 56 of the floor path P5 is opened. At this time, coolant and cooling water of the engine, both of which are heat exchange media, are supplied to the first and second heat exchangers 100 and 200, respectively.

Thus, the air supplied to the main path P1 by the blower unit 23 is cooled as it passes through the first heat exchanger 100. Then, a portion of the air is supplied to the front panel vent through the main path P1 and the front path P3, whereas the remaining portion thereof is heated as it passes through the second heat exchanger 200 and then supplied to the floor vent through the floor vent P5. Here, the air supplied through the floor path P5 can be supplied to the floor vent of the front and rear sides according to the manner in which the ducts are connected. Also, the ratio of the amount of air supplied to the front panel vent and the amount supplied to the floor vent can be appropriately controlled by varying the degree to which the doors 51, 52, 56 and 57 are opened.

Figure 9:
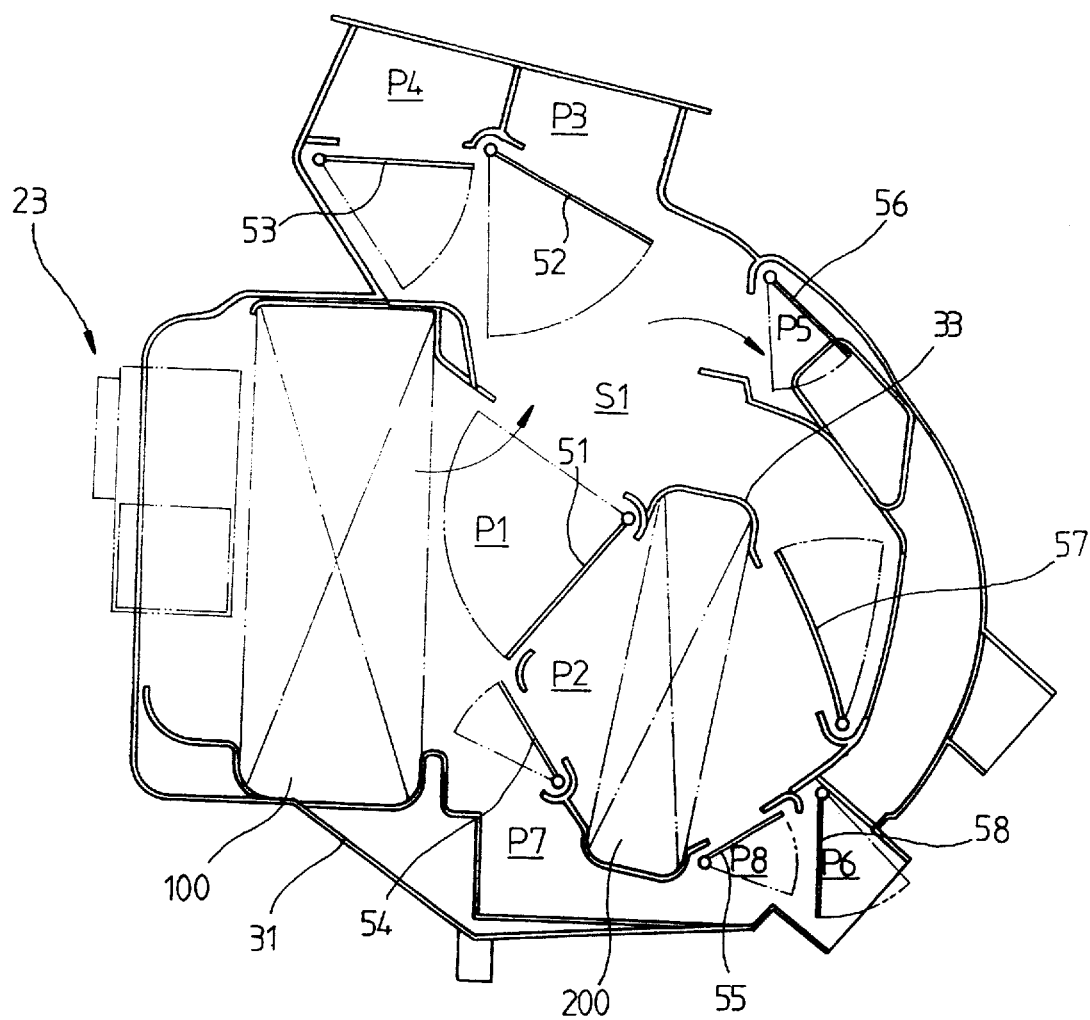

When in a floor mode in which the air supplied through the main path P1 and cooled by the first heat exchanger 100 or an evaporator is supplied to the floor vent, during cooling, as shown in FIG. 9, the floor path P5 is opened by pivoting the sixth door 56 and the other paths are blocked by the respective doors. Thus, the air supplied to the main path P1 is cooled while passing through the first heat exchanger 100 and then suppled to the floor vent through the floor path P5 so that the inside of the automobile becomes cool.

At this time, the cool air suppled to the floor path P5 can be blown to the rear floor vent according to the structure of the ducts.

Figure 10:
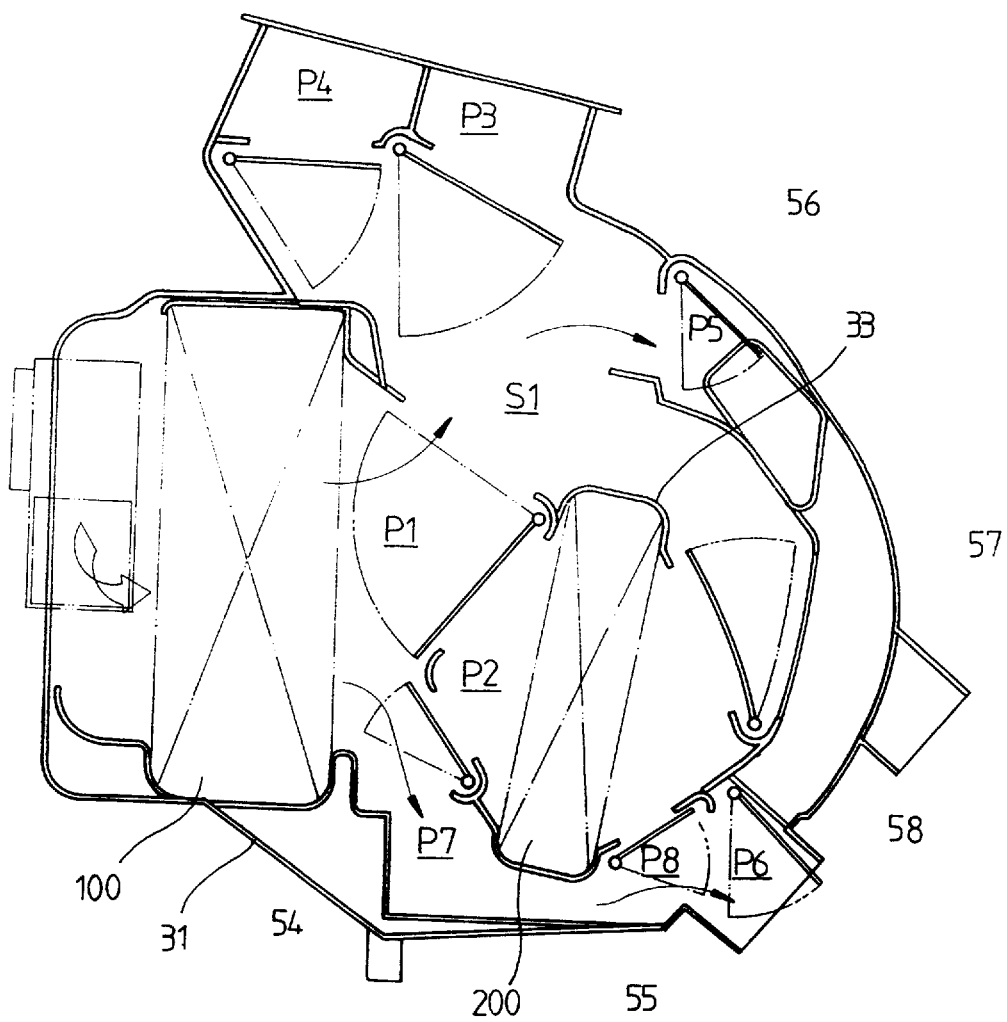

In the floor mode, in order to supply cool air toward the rear console, the console path P6 connected to the bypass P7 is opened by pivoting the eighth door 58 as shown in FIG. 10. Thus, the air cooled as it passes through the first heat exchanger 100 is supplied to the rear console through the bypass P7 and the console path P6.

Figure 11:
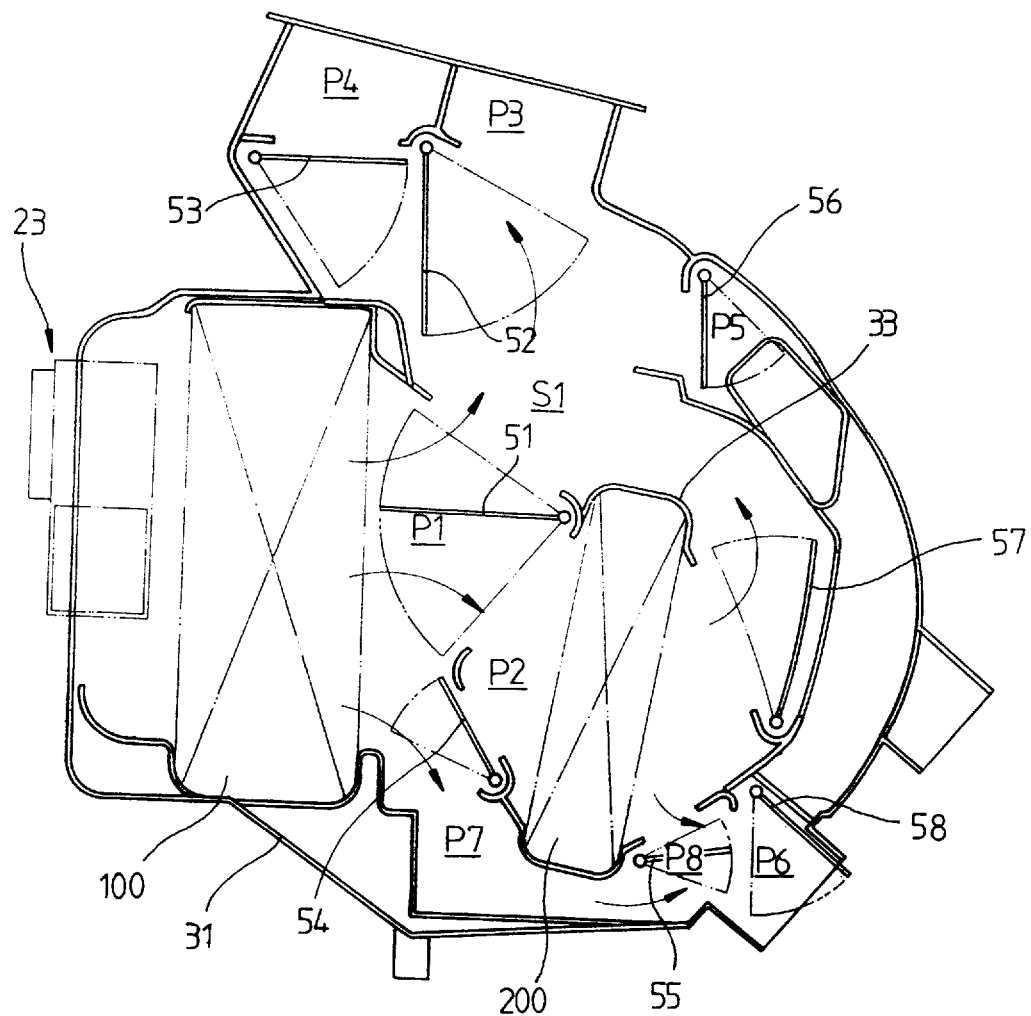

In a mixed mode, the cooled air and the heated air are mixed, or the outside air having a low temperature and heated air are mixed and supplied. Referring to FIG. 11, the main path P1 and the bi-path P2 are all open by partially opening the first door 51. Also, the inlet of the bypass P7 is opened by the fourth door 54 and the outlet of the bypass P7 is partially opened by the fifth door 55. The console path P6 is opened by the eighth door 58. The front path P3, the defrost path P4 and the floor path P5 are selectively opened by manipulating the second, third and sixth doors 52, 53 and 56.

In the above state, a portion of the air cooled as it passes through the first heat exchanger 100 goes to the mixing space S1 after passing through the main path P1 and the remaining portion thereof is heated while passing through the second heat exchanger 200 installed in the bi-path P2. A portion of the heated air flows into the mixing space Si of the main path P1. Thus, the air passed through the main path P1 and the bi-path P2 is mixed in the mixing space S1 and is supplied to the front path P3 or defrost path P4 and the floor path P5, which are selectively opened.

A portion of the air cooled as it passes through the first heat exchanger 100 flows through the bypass P7, and the air is mixed with the heated air flowing into the connection path P8 and then supplied to the rear console through the console path P6.

Figure 12:
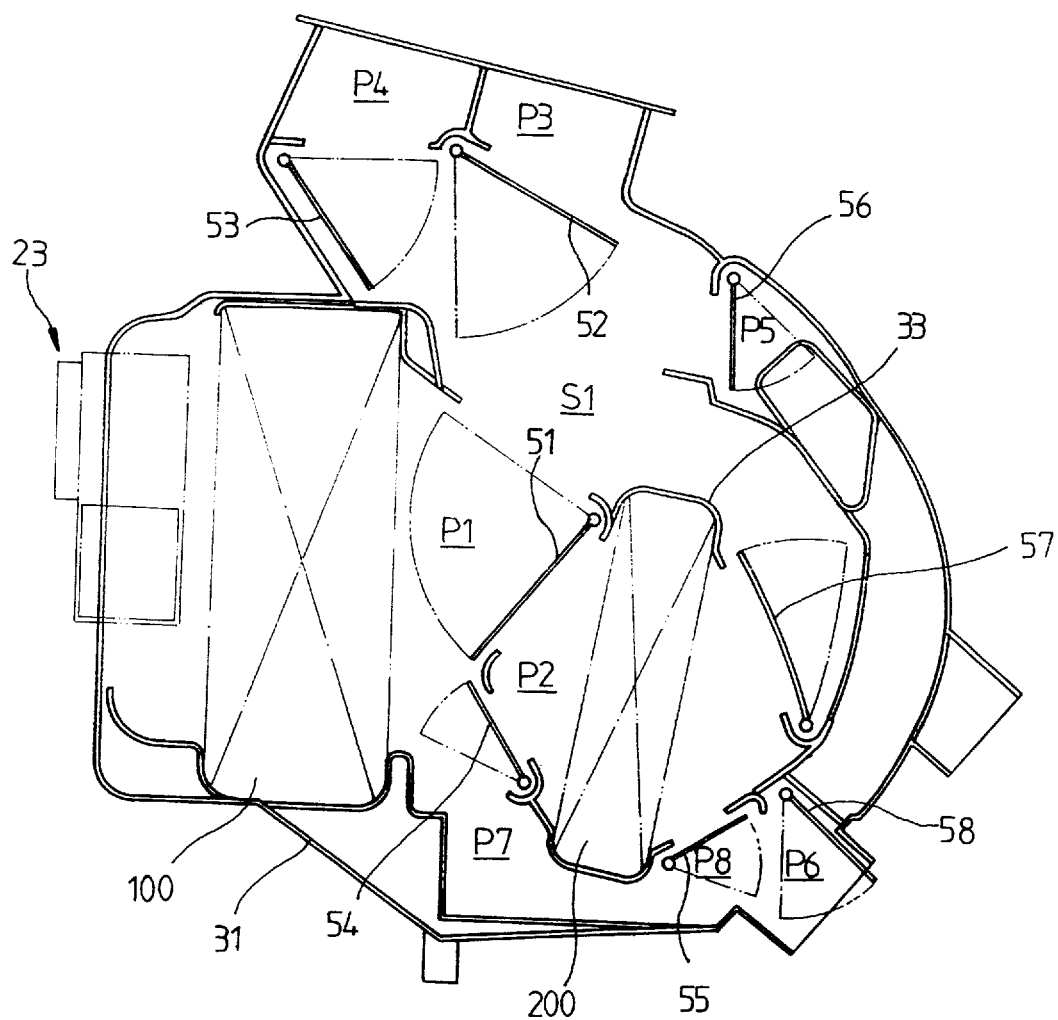

A defrost mode by which frost formed on the window of the automobile is removed will be described with reference to FIG. 12.

In a defrost mode, the inlet of the bi-path P2 is closed by the first door 51 and the third door 53 of the defrost path P4 is opened while the other doors are closed. Thus, the air blown by the blower unit 23 is supplied to the defrost vent through the defrost path P4. At this time, the air can be supplied to the rear console by opening the bypass P7 and the console path P6.

The actions of the doors according to the respective air-flow modes in the case of heating the inside of the automobile will now be described. During the heating mode, the coolant is not supplied to the first heat exchanger 100 since the compressor 21 (see FIG. 2) does not operate.

Figure 13:
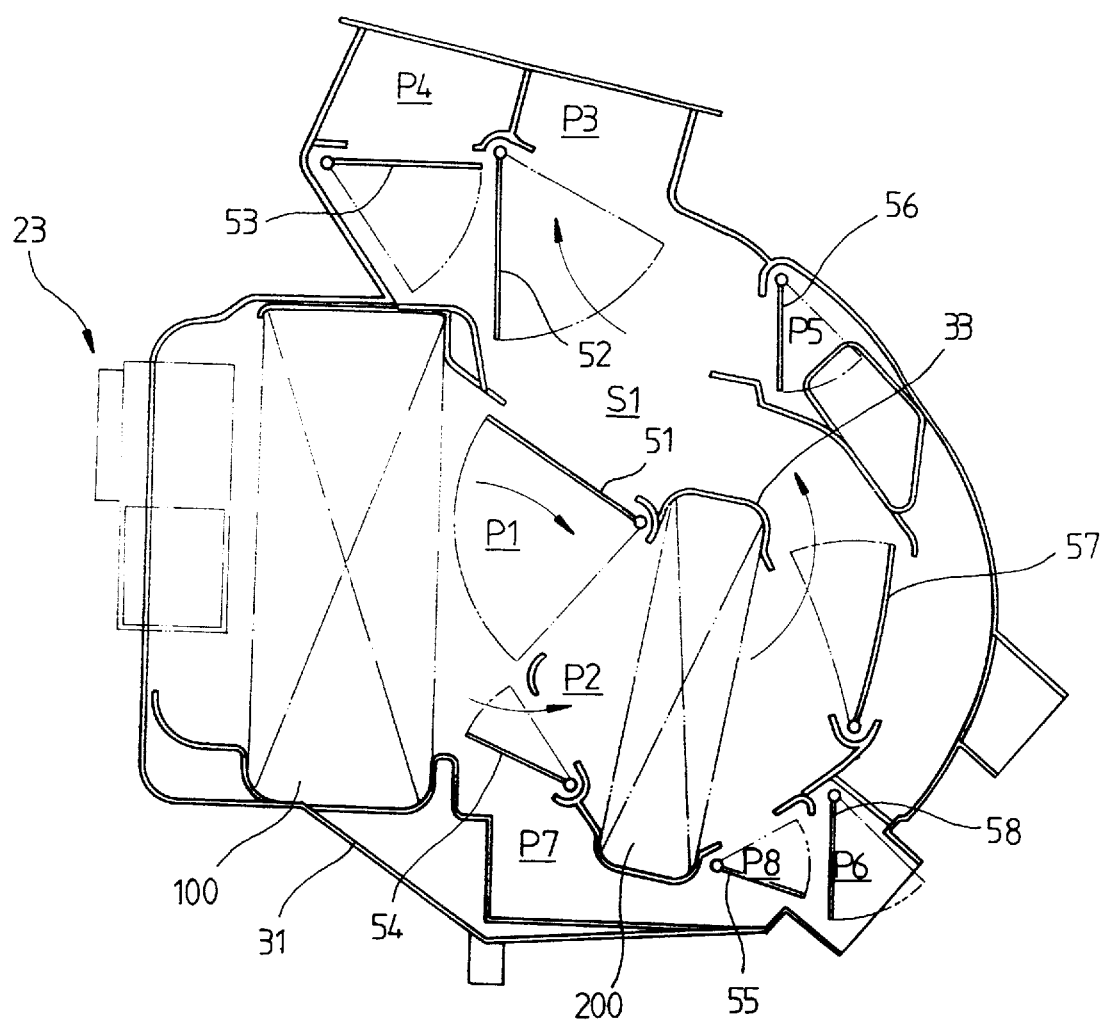

In a vent mode in which the heated air is supplied to the front panel vent, as shown in FIG. 13, the main path P1 and the bypass P7 are blocked and the bi-path P2 is opened by pivoting the first door 51 and the fourth door 54. The front path P3 is opened by opening the seventh door 57 installed in the outlet of the bi-path P2 and pivoting the second door 52. The remaining doors are kept closed.

In the above state, the air supplied from the blower unit 23 passes through the first heat exchanger 100 and is heated as it passes through the second heat exchanger 200. The heated air is supplied to the front panel vent through the mixing space S1 of the main path P1 and the front path P3.

Figure 14:
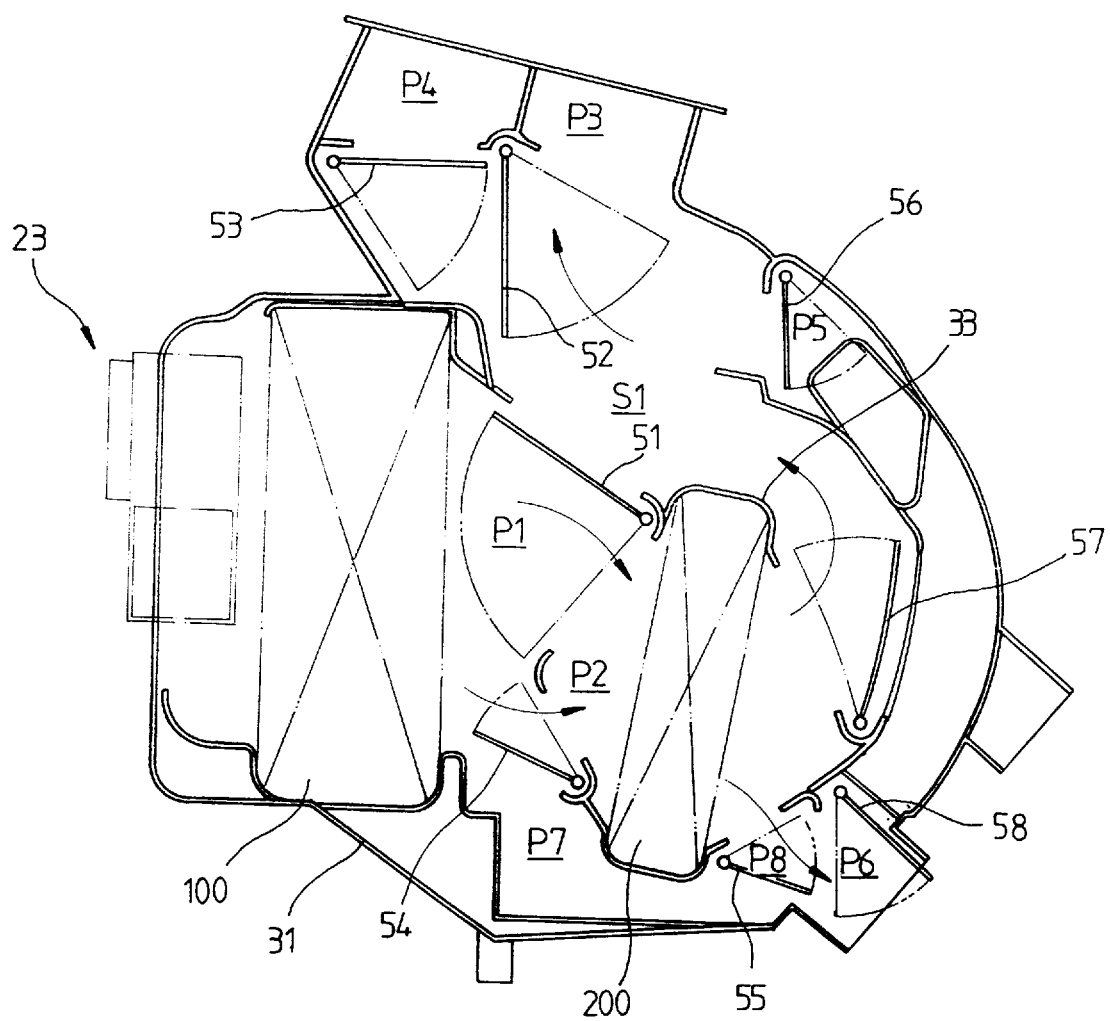

In order to supply the heated air to the rear console in such a state, the connection path P8 and the console path P6 are opened by the fifth door 55 and by the eighth door 58, respectively, as shown in FIG. 14. Thus, the air passing through the second heat exchanger 200 is supplied to the rear console through the connection path P8 and the console path P6.

Figure 15:
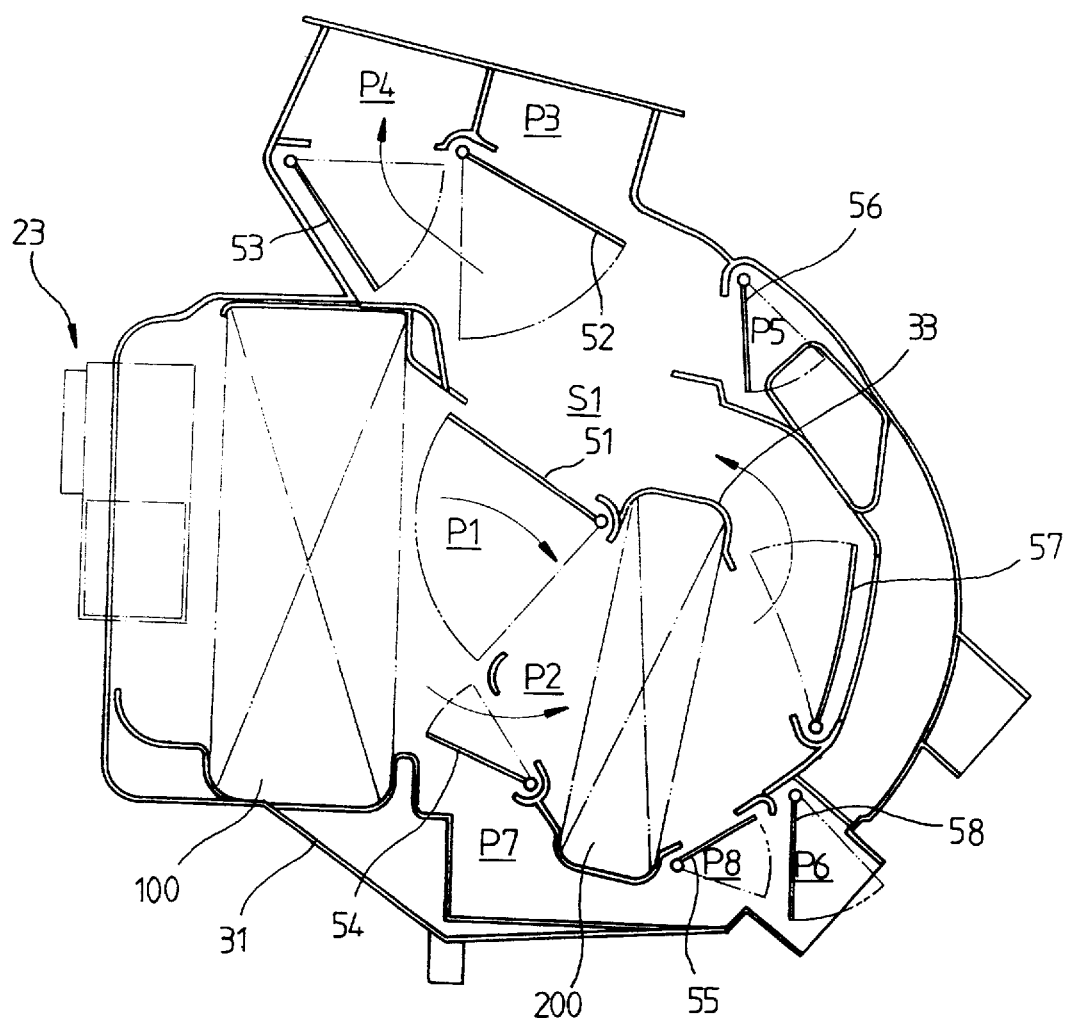

Also, in the defrost mode, as shown in FIG. 15, the defrost path P4 is opened by the third door 53. Thus, the air passing through the second heat exchanger 200 is supplied to the defrost vent through the defrost path P4.

Figure 6:
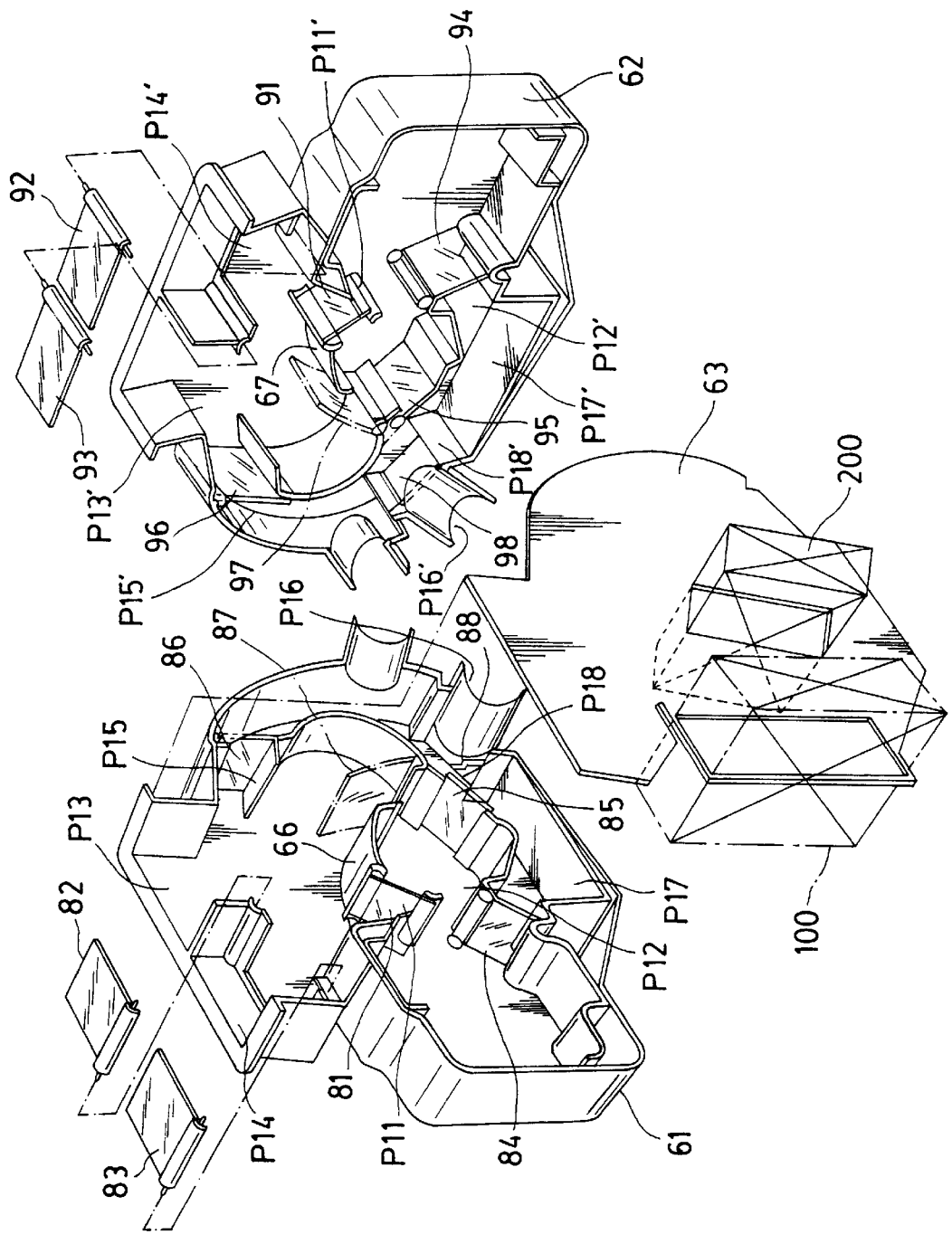
FIG. 6 is an exploded perspective view of a casing unit according to another embodiment of the present invention.

A casing unit according to another embodiment of the present invention is illustrated in FIG. 6.

In this embodiment, the casing unit is formed by forming two casing units of the previous embodiment in parallel. That is, the present casing unit includes left and right cases 61 and 62 and a partitioning panel 63 installed between the left and right cases 61 and 62 and forming first and second main paths P11 and P11' inside the left and right cases 61 and 62. Also, first and second bi-paths P12 and P12', which are separated by partition walls 66 and 67, are formed inside the left and right cases 61 and 62. First and second front paths P13 and P13' and first and second defrost paths P14 and P14', which are distribution paths connected to the first and second main paths P11 and P11', are formed in the upper portion of the left and right cases 61 and 62.

First and second floor paths P15 and P15' which are connected to the ducts going to the floor vent (not shown) and first and second console paths P16 and P16' which are connected to the rear console (not shown) are formed in the left and right cases 61 and 62 opposite the first and second main paths P11 and P11'.

The first heat exchanger 100 using coolant as a heat exchange medium is installed in the first and second main paths P11 and P11' and the second heat exchanger 200 using the cooling water of the engine as a heat exchange medium is installed in the first and second bi-paths P12 and P12'. Here, it is preferable for the first and second heat exchangers 100 and 200 to be installed throughout the left and right cases 61 and 62 by penetrating the partitioning panel 63. Alternatively, the heat exchangers 100 and 200 can be independently installed in each of the left and right cases 61 and 62.

First and second bypasses P17 and P17', which respectively connect the first and second main paths P11 and P11' to the first and second console paths P16 and P16', are formed in each of the left and right cases 61 and 62. Also, first and second connection paths P18 and P18', which respectively connect the outlets of the first and second bi-paths P12 and P12' to the first and second bypasses 17 and P17', are formed in each of the left and right cases 61 and 62.

Left doors 81–88 and right doors 91–98 for opening/closing the respective paths are installed in the left and right cases 61 and 62. The structure and function of the left and right doors 81–88 and 91–98 are the same as those in the above described embodiment.

According to the present embodiment, since the left and right cases 61 and 62 are independently operated, individual cooling/heating for every portion inside the automobile, i.e., a driver's seat, a passenger's seat and the rear seat, is possible. In this case, the above paths should be combined with the ducts which are connected to each portion inside the automobile.

As described above, according to the present invention, since cool or heated air can be selectively supplied to the front seat and the rear seat inside the automobile, a partial cooling/heating according to a position is possible. Also, since the cooling/heating can be concurrently performed for front seat and the rear seat of the automobile using a single casing unit, the structure of the air conditioning system is simplified. Furthermore, various air-flow modes can be realized by selectively operating the doors.

It is noted that the present invention is not limited to the preferred embodiment described above, and it is apparent that variations and modifications by those skilled in the art can be effected within the spirit and scope of the present invention as defined in the appended claims. For instance, two casing units can be employed.

What is claimed is:

1. A casing unit of an air conditioning system comprising:
   a case which includes:
   a main path through which air is supplied by a blower unit and in which a first heat exchanger is installed;
   a bi-path formed by a partition wall to connect the inlet and outlet thereof to the main path and in which a second heat exchanger is installed;
   a plurality of distribution paths including a front path connected to the main path to receive air passed through one or both of the main path and the bi-path to supply air to a vent of a front panel of an automobile interior, a defrost path to supply air to a defrost vent of the automobile interior, a floor path to supply air to a floor vent and a rear floor vent of the automobile interior, and a console path connected to the bi-path via a connection path to supply air to a rear console of the automobile interior and to which air can be supplied from the bi-path without air being supplied from the bi-path to the main path;
   a bypass connected to the console path and the connection path to supply air which has passed through the first heat exchanger to the console path and the connection path;
   a first door for opening/closing the inlet of the bi-path and the main path between the first and second heat exchangers;
   a second door for opening/closing the outlet of the bi-path;
   third doors for opening/closing the distribution paths;
   a fourth door for opening/closing the inlet of the bypass; and
   a fifth door for opening/closing the connection path.

2. A casing unit of an air conditioning system comprising:
   left and right cases for controlling the temperature of left and right sides of an interior of an automobile, each of the cases including:
   a main path through which air is supplied by a blower unit and in which a first heat exchanger is installed;
   a bi-path formed by a partition wall to connect the inlet and outlet thereof to the main path and in which a second heat exchanger is installed;
   a plurality of distribution paths including a front path connected to the main path to receive air passed through one or both of the main path and the bi-path to supply air to a vent of a front panel of an automobile interior, a defrost path to supply air to a defrost vent of the automobile interior, a floor path to supply air to a floor vent and a rear floor vent of the automobile interior, and a console path connected to the bi-path via a connection path to supply air to a rear console of the automobile interior and to which air can be supplied from the bi-path without air being supplied from the bi-path to the main path;
   a bypass which has an inlet positioned between the first and second heat exchangers and which is connected to the console path and the connection path;
   a partition panel positioned between the left and right cases to partition the paths into left and right sides;
   first doors for opening/closing the inlet of the bi-path and the main path between the first and the second heat exchangers;
   second doors for opening/closing the outlet of the bi-path;
   third doors for opening/closing the distribution paths;
   fourth doors for opening/closing the inlet of the bypass; and
   fifth doors for opening/closing the connection path.

3. An air conditioning system comprising:
   a blower unit;
   left and right cases for controlling the temperature of left and right sides of an automobile interior, each of the cases including:
   a main path through which air is supplied by the blower control unit and in which a first heat exchanger is installed;
   a bi-path formed by a partition wall to connect the inlet and outlet thereof to the main path and in which a second claimed heat exchanger is installed;
   a plurality of distribution paths including a front path connected to the main path to receive air passed through one or both of the main path and the bi-path to supply air to a vent of a front panel of an automobile interior, a defrost path to supply air to a defrost vent of the automobile interior, a floor path to supply air to a floor vent and a rear floor vent of the automobile interior, and a console path connected to the bi-path via a connection path to supply air to a rear console of the automobile interior and to which air can be supplied from the bi-path without air being supplied from the bi-path to the main path;
   a bypass which has an inlet positioned between the first and second heat exchangers and which is connected to the console path and the connection path;
   a partition panel positioned between the left and right cases to partition the paths into left and right sides with respect to the air flow direction;
   first doors for opening/closing the inlet of the bi-path and the main path between the first and the second heat exchangers;
   second doors for opening/closing the outlet of the bi-path;
   third doors for opening/closing the distribution paths;
   fourth doors for opening/closing the inlet of the bypass; and
   fifth doors for opening/closing the connection path.

4. The casing unit according to claim 1, wherein the inlet of the bi-path can be selectively opened and closed by each of the first and fourth doors.

5. The casing unit according to claim 1, wherein the fourth and fifth doors can be opened and closed independently of each other.

6. The casing unit according to claim 2, wherein the inlets of the bi-paths of the left and right cases can be selectively opened and closed by each of the first and fourth doors.

7. The casing unit according to claim 2, wherein the fourth and fifth doors can be opened and closed independently of each other.

8. The air conditioning system according to claim 3, wherein the inlets of the bi-paths of the left and right cases can be selectively opened and closed by each of the first and fourth doors.

9. The casing unit according to claim 3, wherein the fourth and fifth doors can be opened and closed independently of each other.

10. A casing unit of an air conditioning system comprising:

a case which includes:

a main path through which air is supplied by a blower unit and in which a first heat exchanger is installed;

a bi-path formed by a partition wall to connect the inlet and outlet thereof to the main path and in which a second heat exchanger is installed;

a plurality of distribution paths including a front path connected to the main path to receive the air passed through one or both of the main path and the bi-path to supply the air to a vent of a front panel of an automobile interior, a defrost path to supply air to a defrost vent of the automobile interior, a floor path to supply air to a floor vent and a rear floor vent of the automobile interior, and a console path connected to the bi-pass via a connection path to supply air to a rear console of the automobile interior and to which air can be supplied from the bi-path without air being supplied from the bi-path to the main path;

a bypass connected to the console path and the connection path to supply air passed through the first heat exchanger to the console path and the connection path;

a first door for opening and closing the inlet of the bi-path and the main path between the first and second heat exchangers;

a second door for partially opening and closing the connection path when the outlet of the bi-path is opened or closed;

third doors for opening and closing the distribution paths; and a fourth door for partially opening and closing the inlet of the bypass and the bi-path.

\* \* \* \* \*